(12) United States Patent
Huh et al.

(10) Patent No.: US 8,412,948 B2
(45) Date of Patent: Apr. 2, 2013

(54) METHOD AND APPARATUS FOR DIGITAL SIGNATURE GENERATION AND VALIDATION

(75) Inventors: Mi-suk Huh, Suwon-si (KR);
Kyung-hee Lee, Yongin-si (KR);
Tae-chul Jung, Seongnam-si (KR);
Sergey Bezzateev, St. Petersburg (RU);
Alexey Sitalov, St. Petersburg (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1893 days.

(21) Appl. No.: 11/366,419

(22) Filed: Mar. 3, 2006

(65) Prior Publication Data

US 2007/0180256 A1    Aug. 2, 2007

(30) Foreign Application Priority Data

Mar. 3, 2005  (KR) .................. 10-2005-0017716

(51) Int. Cl.
*H04L 9/08* (2006.01)
*H04L 9/32* (2006.01)

(52) U.S. Cl. ......... 713/181; 713/180; 380/264; 380/280

(58) Field of Classification Search .............. 380/280
See application file for complete search history.

(56) References Cited

U.S. PATENT DOCUMENTS

| | | | | |
|---|---|---|---|---|
| 5,995,623 | A * | 11/1999 | Kawano et al. | 713/189 |
| 8,275,125 | B2 * | 9/2012 | Vijayarangan | 380/28 |
| 2002/0184504 | A1 * | 12/2002 | Hughes | 713/177 |
| 2003/0233542 | A1 * | 12/2003 | Benaloh | 713/156 |
| 2007/0162958 | A1 * | 7/2007 | Kao et al. | 726/4 |

* cited by examiner

*Primary Examiner* — Kaveh Abrishamkar
(74) *Attorney, Agent, or Firm* — Sughrue Mion, PLLC

(57) ABSTRACT

An apparatus and method are provided for reducing time taken for generating a digital signature and generating the digital signature using a minimum number of operations using at least two secret keys. One secret key among at least two secret keys may be set from a value resulting from hashing a message to be transmitted. A number of times for hashing the secret key is determined, and a value resulting from hashing the determined secret key by the determined hashing number of times is set as the digital signature.

18 Claims, 5 Drawing Sheets

US 8,412,948 B2

METHOD AND APPARATUS FOR DIGITAL SIGNATURE GENERATION AND VALIDATION

CROSS-REFERENCE TO RELATED APPLICATIONS

This application claims benefit under 35 U.S.C. §119 from Korean Patent Application No. 2005-17716, filed on Mar. 3, 2005, the entire content of which is incorporated herein by reference.

BACKGROUND OF THE INVENTION

1. Field of the Invention

Methods and apparatuses consistent with the present invention relate to digital signature generation, and in particular, to reducing a degree of complexity of the signature for generating the digital signature and rapidly carrying out the digital signature generation.

2. Description of the Related Art

A digital signature is information generated for validating identification of the signer by the medium of a computer. The digital signature is an electronic document attached to or logically connected to a document message, and is used for validating the signer and representing an approval of the signer about contents of the document message. The digital signature is an electronic substitution for a manual signature or a seal. In general, a public key encryption scheme (i.e., an asymmetrical encryption system) is used for the digital signature.

The digital signature acts to prove the fact that a person who is written as the signer of the digital signature has created the electronic document and the fact that the contents are not forged nor altered in transit. The digital signature also acts to prevent the person from subsequently denying that he has written the contents.

The digital signature has the capability of reducing the risk of information leakage which might occur in an Internet shopping transaction or a cyber financial transaction, so that a fraudulent use or alteration of the personal information can be prevented by utilizing the digital signature.

A representative usage of the digital signature may correspond to a financial transaction such as Internet banking, Internet public affairs service, Internet shopping and so forth, and may extend to international e-commerce, electronic voting and so forth in the future. A public certificate necessary for an Internet banking or an on-line stock trading is a representative digital signature which is issued by a certificate authority designated by the country. The certificate authority manages a public key.

FIG. 1 shows an example of generating a digital signature in the related art. Hereinafter, a method of generating the digital signature according to the related art will be described with reference to FIG. 1. Hereinafter, an apparatus generating the digital signature will be referred to as a digital signature generation unit for simplicity of description.

When a message to be transmitted is generated, the digital signature generation unit generates a digital signature from the generated message. The digital signature generation unit calculates a hash operation value from the generated message using a hash function. The digital signature generation unit generates the digital signature using the calculated hash operation value.

When the hash operation value generated by the digital signature generation unit is represented as eight bits, the hash operation value generated by the digital signature generation unit has values in range of '0000 0000' to '1111 1111'. That is, the hash operation value has values from '0' to '$2^8-1$'. Referring to FIG. 1, n is $2^8-1$. When the hash operation value of the generated message is '0000 1111', it can be represented as '15' in the decimal numeral.

The digital signature generation unit uses, as the digital signature, a value resulting from hashing with a secret key (a).

The hash operation value from the generated message is used to determine the number of times for hashing the secret key in the digital signature generation unit. As described above, the hash operation value of the generated message is '15', so that the digital signature to be delivered has a key value which is hashed fifteen times to generate the public key. That is, the digital signature generation unit sets '$h^{2^{(8)}-1-15}(a)$' to the digital signature.

Referring to FIG. 1, a denotes a secret key, and h"(a) is a public key. Accordingly, the hash function is a unidirectional function so that a third party cannot obtain the secret key from the public key.

A digital signature receiving unit receives the message and the digital signature from the digital signature generation unit. The digital signature receiving unit calculates a value by hashing the received message. The digital signature receiving unit then hashes the received digital signature by the number of times corresponding to the calculated value. As described above, if the number corresponding to the calculated value from the message is '15', the digital signature receiving unit hashes the received digital signature fifteen times. When the value resulting from the fifteen hash operations is equal to the public key, the digital signature receiving unit recognizes that the digital signature is not forged nor altered. However, when the value resulting from the fifteen hash operations is not equal to the received public key, the digital signature receiving unit recognizes that the digital signature is forged or altered.

As described with reference to FIG. 1, the digital signature receiving unit hashes the received digital signature by the number of times corresponding to the calculated value. That is, the number corresponding to the calculated value is proportional to the number of hash operations. Accordingly, when the number corresponding to the calculated value is large, the number of hash operations also increases.

When the number corresponding to the calculated value is large, the number of operations carried out in the digital signature receiving unit increases, which in turn causes an increase in time taken for validating the forgery or alteration of the digital signature.

Similar problems occur in the digital signature generation unit. That is, the number corresponding to the value calculated in the digital signature generation unit is in inverse proportion to the number of hash operations. That is, when the number corresponding to the value calculated in the digital signature generation unit is small, the number of hash operations for the secret key increases. Accordingly, the number of operations of the digital signature generation unit increases, which in turn causes an increase in time taken for generating the digital signature.

SUMMARY OF THE INVENTION

The present invention provides a method for reducing time taken for the digital signature generation unit to generate the digital signature.

The present invention also provides a method for generating the digital signature by enabling the digital signature generation unit to use a minimum number of operations.

The present invention also provides a method for enabling the digital signature receiving unit to validate whether the digital signature is forged or altered by means of the minimum number of operations.

The present invention also provides a method for enabling the digital signature receiving unit to reduce the time taken for generating the public key from the received digital signature.

According to one aspect of the present invention, there is provided a method of generating a digital signature, which includes: determining one secret key among at least two secret keys set from a value resulting from hashing a message to be transmitted, and the number of times for hashing the secret key; and setting a value resulting from hashing the determined secret key by the determined hashing number of times as the digital signature.

According to another aspect of the present invention, there is provided a method of validating a digital signature, which includes: calculating a number of times of hashing the received digital signature received from a value resulting from hashing a received message; and validating whether a value resulting from hashing the digital signature by the calculated number of times is equal to any one public key between at least two public keys.

According to yet another aspect of the present invention, there is provided a digital signature generation and validation system, which includes: a digital signature generation unit determining one secret key among at least two secret keys set from a value resulting from hashing a message to be transmitted, and the number of times of hashing the secret key, setting a value resulting from hashing the determined secret key by the determined hashing number of times as the digital signature, and transmitting the set digital signature and the message; and a digital signature receiving unit calculating a number of times of hashing the received digital signature received from a value resulting from hashing a received message, and validating whether a value resulted from hashing the digital signature by the calculated number of times is equal to any one public key among at least two public keys.

According to yet another aspect of the present invention, there is provided a digital signature generation apparatus, which includes: a decision unit determining one secret key among at least two secret keys set from a value resulting from hashing a message to be transmitted, and the number of times of hashing the secret key; and a setting unit setting a value resulting from hashing the determined secret key by the determined hashing number of times as the digital signature.

BRIEF DESCRIPTION OF THE DRAWINGS

The above and other aspects and features of the present invention will be more apparent by describing exemplary embodiments of the present invention with reference to the accompanying drawings, in which.

DETAILED DESCRIPTION OF THE EXEMPLARY EMBODIMENTS

The present invention proposes a method of generating the digital signature by using at least two secret keys. Hereinafter, an exemplary embodiment of the method for generating the digital signature proposed by the present invention will be described with reference to accompanying drawings.

The matters defined in the description such as a detailed construction and elements are provided to assist in a comprehensive understanding of the invention. Thus, it is apparent that the present invention can be carried out without those defined matters. Also, well-known functions or constructions are not described in detail since they would obscure the invention in unnecessary detail.

Figure 1:
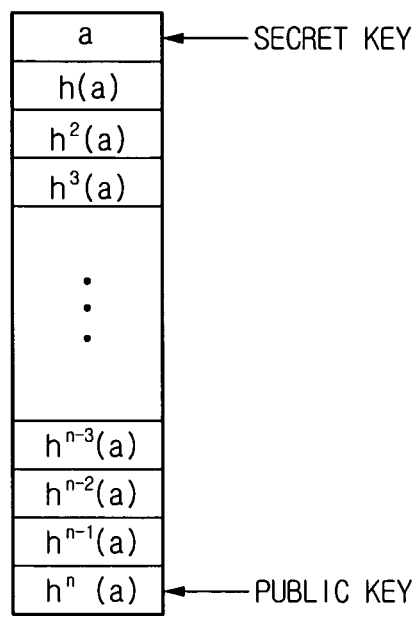
FIG. 1 is a view illustrating a secret key and a public key for generating a digital signature in the related art.
Figure 2:
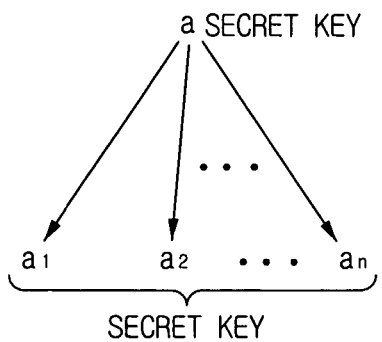
FIG. 2 is a view illustrating at least two secret keys in accordance with an exemplary embodiment of the present invention.

FIG. 2 shows secret keys used in an exemplary embodiment of the present invention. That is, only one secret key 'a' was used in the related art, whereas a plurality of secret keys $a_1$, to $a_n$ is used to generate the digital signature in the present invention.

Figure 3:
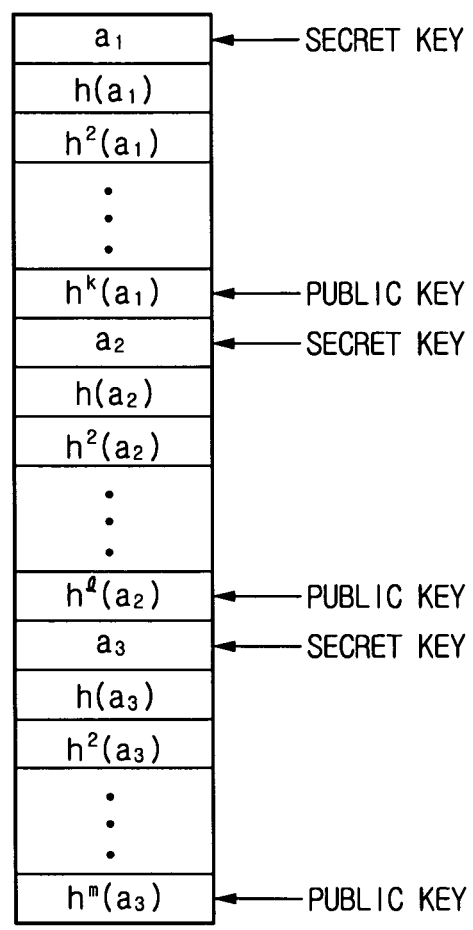
FIG. 3 is a view illustrating a secret key and a public key for generating a digital signature in accordance with an exemplary embodiment of the present invention.

FIG. 3 is a view for explaining the method of generating the digital signature by using the secret keys in accordance with an exemplary embodiment of the present invention. Hereinafter, the method of generating the digital signature according to the present invention will be described in detail with reference to FIG. 3.

FIG. 3 shows three secret keys $a_1$, $a_2$, $a_3$, however, the number of the secret keys may be varied in response to a setting of a user. In addition, it shows a public key $h^k(a_1)$ related to the secret key $a_1$, a public key $h^l(a_2)$ related to the secret key $a_2$, and a public key $h^m(a_3)$ related to the secret key $a_3$. The size of k, l, and m can be varied in response to a setting of the user.

Figure 7:
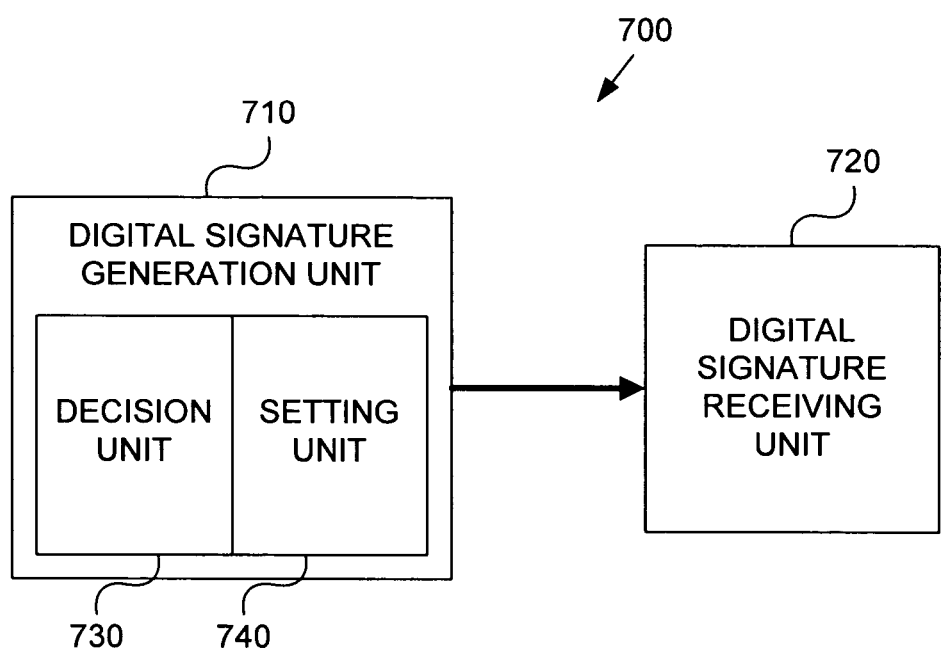
FIG. 7 is a block diagram of a digital signature generation and validation system in accordance with an exemplary embodiment of the present invention.

Hereinafter, an apparatus generating the digital signature will be referred to as a digital signature generation unit for simplicity of description. FIG. 7 is a block diagram of a digital signature generation and validation system 700 in accordance with an exemplary embodiment of the present invention illustrating a digital signature generation unit 710 and a digital signature receiving unit 720.

When a message m to be transmitted is generated, the digital signature generation unit 710 generates a digital signature from the generated message. The digital signature generation unit 710 calculates a hash operation value from the generated message using a hash function. A decision unit 730 determines a secret key and a number of times to hash the secret key based at least in part on the hash operation value. The a setting unit 740 sets the digital signature using the calculated hash operation value.

By way of an example, when the hash operation value generated in the digital signature generation unit 710 is represented as four bits, the hash operation value generated in the digital signature generation unit 710 has values from '0000' to '1111'. That is, the hash operation value has values from '0' to '15'. In general, the message having a variable length has a constant length when the hash operation is carried out thereon.

Hereinafter, an example of 'k', 'l', and 'm' will be described for simplicity of description. That is, it is assumed that 'k' is 6, and 'l' and 'm' are 5. When the hash operation value of the generated message is '0011', it can be represented as '3' in the decimal numeral. The digital signature generation unit 710 generates the digital signature using the hash operation value of the generated message. Table 1 below shows the digital signatures corresponding to the hash operation values.

TABLE 1

| Hash operation value | Digital signature |
| --- | --- |
| 0 | $h^4(a_3)$ |
| 1 | $h^3(a_3)$ |
| 2 | $h^2(a_3)$ |
| 3 | $h^1(a_3)$ |
| 4 | $a_3$ |
| 5 | $h^4(a_3)$ |
| 6 | $h^3(a_2)$ |
| 7 | $h^2(a_2)$ |
| 8 | $h^1(a_2)$ |
| 9 | $a_2$ |
| 10 | $h^5(a_1)$ |
| 11 | $h^4(a_1)$ |
| 12 | $h^3(a_1)$ |
| 13 | $h^2(a_1)$ |
| 14 | $h(a_1)$ |
| 15 | $a_1$ |

By doing so, a number of operations for generating the digital signature in the digital signature generation unit 710 can be reduced, which can in turn decrease the time taken for generating the digital signature.

The digital signature receiving unit 720 validates whether the digital signature is forged or altered using the received message and the digital signature. That is, the digital signature receiving unit 720 calculates the hash operation values of the received message, and hashes the digital signature using the calculated operation values. When the hash operation value is equal to the public key, the digital signature receiving unit 720 recognizes that the digital signature it not forged nor altered, and when the hash operation value is not equal to the public key, the digital signature receiving unit 720 recognizes that the digital signature it forged or altered.

Examples will be given for the above description. The digital signature receiving unit, when the value resulting from hashing the received message is '3', hashes the digital signature three times. When the value hashed three times is equal to '$h^4(a_3)$', the digital signature receiving unit 720 recognizes that the received digital signature is not forged nor altered. The digital signature receiving unit, when the value resulting from hashing the received message is '15', hashes the digital signature five times. When the value hashed five times is equal to '$h^5(a_1)$', the digital signature receiving unit 720 recognizes that the received digital signature is not forged or altered.

As described above, when the number of secret keys to be used increases, the number of operations for generating the digital signature or validating whether the digital signature is forged decreases. That is, the received digital signature was hashed fifteen times when the value resulting from hashing the received message was '15' in accordance the related art, however, it can be validated whether the received digital signature is forged or altered by hashing the received digital signature five times in accordance with the present invention.

Figure 4:
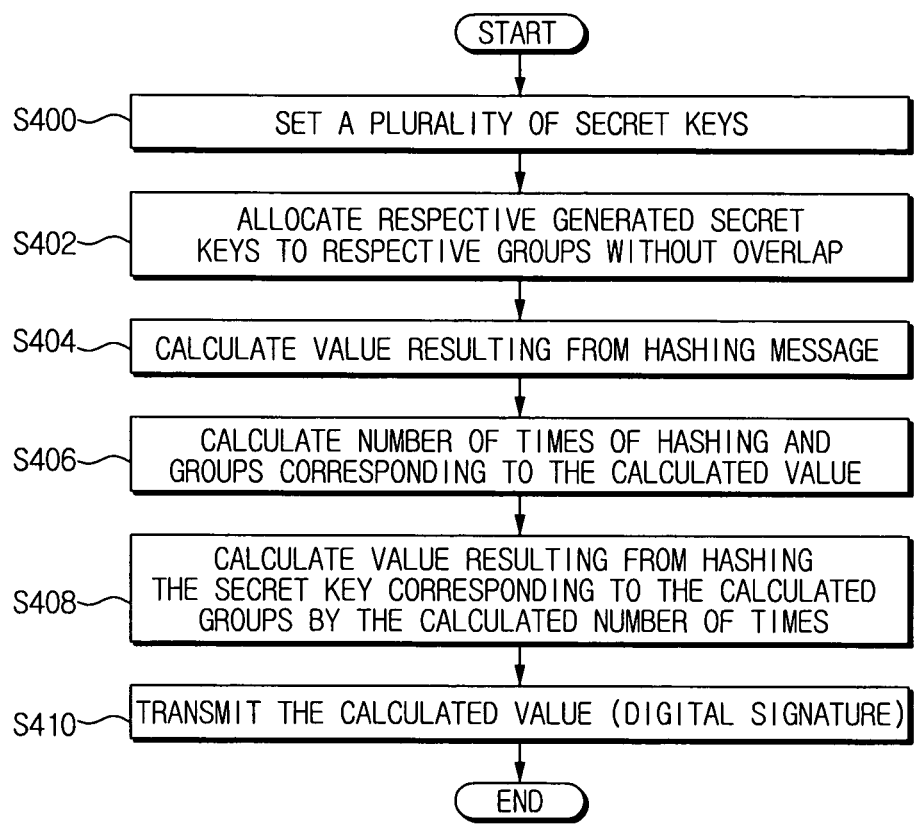
FIG. 4 is a view illustrating operations carried out in the digital signature generation unit in accordance with an exemplary embodiment of the present invention.

FIG. 4 shows operations carried out in the digital signature generation unit 710 in accordance with an exemplary embodiment of the present invention. Hereinafter, operations carried out in the digital signature generation unit 710 in accordance with the exemplary embodiment of the present invention will be described in detail with reference to FIG. 4.

In operation S400, the digital signature generation unit 710 sets a plurality of secret keys. The number of secret keys can be varied in response to a setting of a user. In operation S402, the digital signature generation unit 710 allocates respective generated secret keys to respective groups without any overlap therebetween.

In operation S404, the digital signature generation unit 710 calculates values resulting from hashing the message to be delivered. In operation S406, the digital signature generation unit 710 calculates the groups corresponding to the calculated values and the number of times of hashing. Such operations are carried out in a calculation unit which constitutes a part of the digital signature generation unit. In operation S408, the digital signature generation unit 710 calculates the values resulted from hashing the secret keys corresponding to the calculated groups by the number of times of calculation, and sets the calculated value as the digital signature. Such operations are carried out in a setting unit which constitutes a part of the digital signature generation unit. In operation S410, the digital signature generation unit 710 transmits the calculated values (that is, digital signature). The digital signature generation unit 710 also transmits message along with the digital signature.

Figure 5:
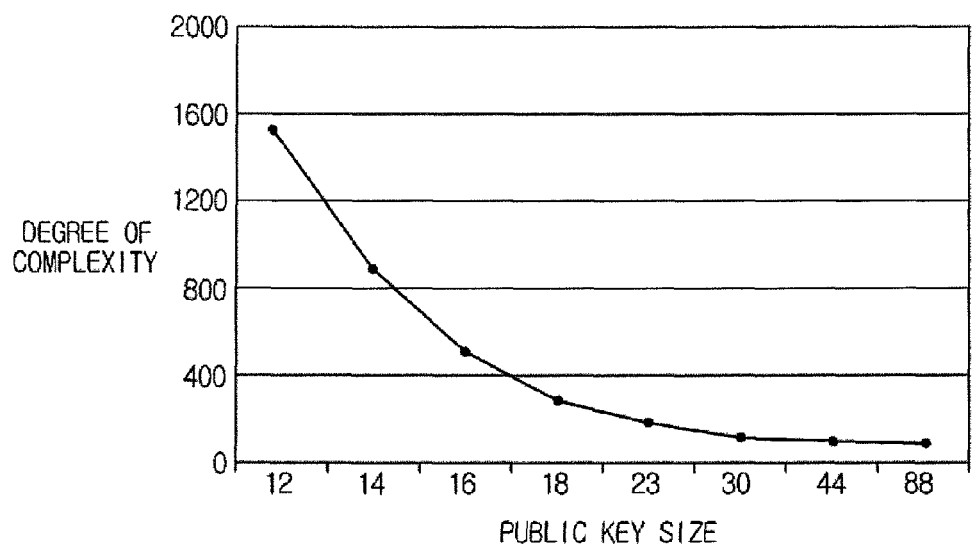
FIG. 5 is a view illustrating relations between a length of a public key and a degree of complexity of operations necessary for validating whether the received digital signature is forged in accordance with the related art.
Figure 6:
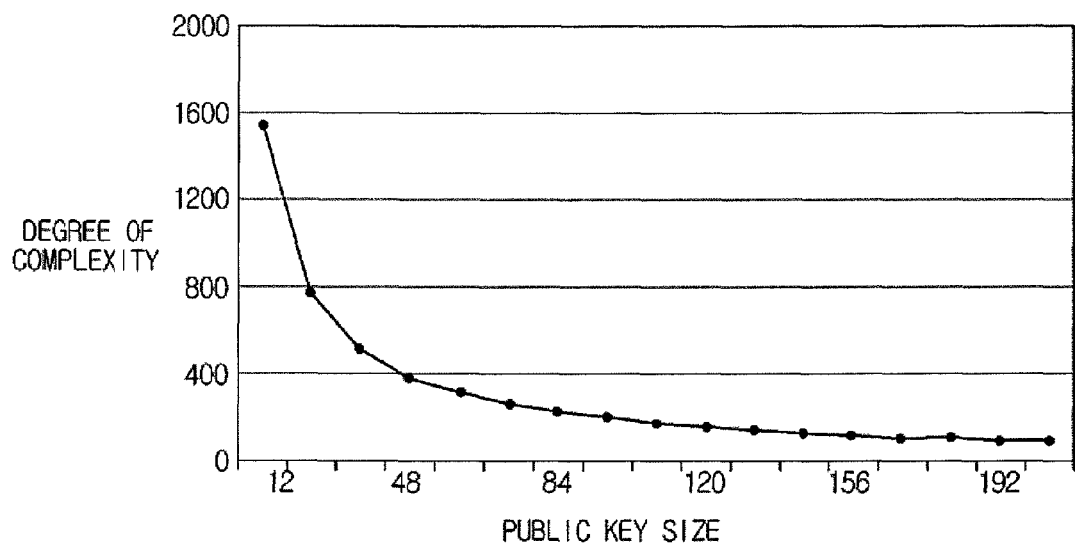
FIG. 6 is a view illustrating relations between a length of a public key and a degree of complexity of operations necessary for validating whether the received digital signature is forged in accordance with an exemplary embodiment of the present invention.

FIG. 5 is a view illustrating relations between a length of a public key and a degree of complexity of operations necessary for validating whether the received digital signature is forged in accordance with the related art, and FIG. 6 is a view illustrating relations between a length of a public key and a degree of complexity of operations necessary for validating whether the received digital signature is forged in accordance with an exemplary embodiment of the present invention.

As shown in FIGS. 5 and 6, the degree of complexity of operations according to the method of the present invention decreases as compared to the related art.

Hereinafter, another exemplary embodiment of generating the digital signature using a plurality of secret keys proposed by the present invention will be described.

Different secret keys to be used can be set in response to kinds of messages to be transmitted. For example, a secret key $a_1$ may be used for a message requiring a rapid transmission speed, a secret key $a_2$ may be used for a message requiring a transmission speed of middle level, and a secret key $a_3$ may be used for a message requiring a slow transmission speed. The message requiring the rapid transmission speed minimizes the number of operations necessary for generating the digital signature or validating whether the received digital signature is forged. This can be possible by reducing the number of hash operations necessary for calculating the public key from the secret key.

In addition, different kinds of secret keys can be set in response to the frequency of transmission. For example, a secret key $a_1$, may be used for a message which is frequently transmitted, a secret key $a_2$ may be used for a message having a transmission number of middle level, and a secret key $a_3$ is used for a message having a small number of transmissions. Besides the above-described methods, other methods may be employed to set different secret keys to be used in response to characteristics of the message.

To this end, the digital signature generation unit 710 changes the hashed value resulting from hashing the message so as to allow the digital signature to be generated by using the corresponding secret key. That is, the digital signature generation unit 710 generates the digital signature by the method illustrated in FIG. 3 when the secret key requested by the message is equal to the secret key corresponding to the hashed value resulting from hashing the message.

However, when the secret key requested by the message is not equal to the secret key corresponding to the hashed value resulting from hashing the message, the digital signature generation unit 710 changes the hashed value. For example, when the secret key requested by the message is the secret key $a_1$, and the secret key corresponding to the hashed value resulting from hashing the message is the secret key $a_3$, the digital signature generation unit 710 adds or subtracts a necessary number so as to include the hashed value in $a_1$. Information about the added number or the subtracted number is delivered to the digital signature receiving unit.

Besides the above-described method, the digital signature receiving unit, when a number added or subtracted to the hashed value is fixed, can include the hashed value in the secret key $a_1$, by repeating the fixed number several times. That is, when the number to be added is '4' and the fixed number is '2', the digital signature generation unit 710 can reduce the number of bits required for transmitting information by only transmitting '2' which is the number of repetitions.

The digital signature receiving unit 720 can validate whether the digital signature is forged by using the received message, the digital signature, and the information.

The digital signature generation unit 710 uses a plurality of secret keys to generate the digital signature as proposed by the present invention, so that a time taken for generating the digital signature can be reduced. In addition, the digital signature generation unit 710 can generate the digital signature even with a small number of operations.

The digital signature receiving unit 720 can also validate whether the received digital signature is forged or altered even with a small number of operations. In addition, the digital signature receiving unit 720 can enable a reduced time taken for validating whether the digital signature is forged or altered.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method of generating a digital signature, the method comprising:
    setting at least two secret keys, dividing hash operation values for messages to be transmitted into a plurality of groups, and allocating a respective one of the at least two secret keys to a respective one of the plurality of groups without any overlap in the allocation of the at least two secret keys to the plurality of groups;
    determining a secret key from among the allocated secret keys based on a hash operation value resulting from hashing a message to be transmitted, and determining a number of times of hashing the secret key corresponding to the hash operation value; and
    setting a value resulting from hashing the determined secret key by the number of times corresponding to the hash operation value as the digital signature.

2. The method according to claim 1, wherein the secret key has a corresponding public key, and the public key is obtained by hashing the secret key by the number of times determined by setting the secret key.

3. The method according to claim 2, wherein the digital signature is the secret key, or a value resulting from hashing the secret key at least one time so as to obtain the public key by hashing the digital signature by the number of times for determining the digital signature.

4. The method according to claim 2, wherein the number of times for hashing the secret key for obtaining the public key is set to the value resulting from hashing the message.

5. The method according to claim 2, wherein the number of times for hashing the secret key for obtaining the public key is set to a different number in response to the secret key.

6. The method according to claim 1, wherein the secret key is determined with respect to a characteristic of a message including at least one of a number of times of transmission, a degree of significance, and a required transmission speed.

7. The method according to claim 6, wherein the value resulting from hashing the message for determining the secret key is changed by a set manner, and information about the change is transmitted with the message and the digital signature.

8. A method of validating a digital signature, the method comprising:
    calculating a value resulting from hashing a received message;
    determining a public key of at least two public keys corresponding to the calculated hashing value and determining a number of times of hashing the digital signature; and
    validating whether a value resulting from hashing the digital signature by the determined number of times is equal to the determined public key.

9. The method according to claim 8, wherein it is determined that the digital signature is not forged if a public key having the same value as the value resulting from hashing the digital signature is present.

10. A digital signature generation and validation system comprising:
    a digital signature generation unit which sets at least two secret keys, divides hash operation values of messages to be transmitted into a plurality of groups, allocates a respective one of the at least two secret keys to a respective one of the plurality of groups without any overlap in the allocation of the at least two secret keys to the plurality of groups, determines a secret key from among the allocated secret keys based on a hash operation value resulting from hashing a message to be transmitted, determines a number of times for hashing the secret key corresponding to the hash operation value, sets as the digital signature a value resulting from hashing the determined secret key by the determined number of times corresponding to the hash operation value, and transmits the set digital signature and the message; and
    a digital signature receiving unit which calculates a value resulting from hashing a received message, determines a public key of at least two public keys corresponding the calculated hashing value and determines a number of times of hashing the digital signature, and validates whether a value resulting from hashing the digital signature by the calculated number of times is equal to the determined public key.

11. The digital signature generation and validation system according to claim 10, wherein the digital signature generation unit has a public key corresponding to the secret key, and the public key is obtained by hashing the secret key by the number of times determined by setting the secret key.

12. The digital signature generation and validation system according to claim 10, wherein the digital signature generation unit sets, as the digital signature, the secret key or a value resulted from hashing the secret key at least one time so as to obtain the public key by hashing the digital signature by the number of times for determining the digital signature.

13. The digital signature generation and validation system according to claim 11, wherein the digital signature generation unit sets the number of times for hashing the secret key for obtaining the public key to the same value resulting from hashing the message.

14. The digital signature generation and validation system according to claim 11, wherein the digital signature generation unit sets the number of times of hashing the secret key for obtaining the public key to a different value in response to the secret key.

15. The digital signature generation and validation system according to claim 10, wherein the digital signature generation unit determines a different secret key based on a characteristic of the message including at least one of a number of times of transmitting the message to be delivered, a degree of significance, and a required transmission speed.

16. A digital signature generation unit comprising:
   a decision unit which determines a secret key among at least two secret keys respectively allocated to a plurality of groups by a value resulting from hashing a message to be transmitted, and determines a number of times of hashing the secret key corresponding to the resulting hashing value; and
   a setting unit which sets a value resulting from hashing the determined secret key by the determined number of times of hashing as the digital signature.

17. The digital signature generation unit according to claim 16, wherein the apparatus has a public key corresponding to the secret key, and the public key is obtained by hashing the secret key by the number of times determined by setting the secret key.

18. The digital signature generation unit according to claim 17, wherein the number of times for hashing the secret key for obtaining the public key is set to a different value in response to the secret key.

* * * * *